US012633173B2

(12) United States Patent
Matsutani et al.

(10) Patent No.: US 12,633,173 B2
(45) Date of Patent: May 19, 2026

(54) INFORMATION PROCESSING DEVICE AND STORAGE MEDIUM

(71) Applicant: TOYOTA JIDOSHA KABUSHIKI KAISHA, Toyota (JP)

(72) Inventors: Shintaro Matsutani, Kariya (JP); Ryuichi Danno, Kasugai (JP); Atsushi Ikegaya, Aisai (JP); Masashi Nomoto, Tokyo (JP); Oral Kaplan, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 18/664,730

(22) Filed: May 15, 2024

(65) Prior Publication Data

US 2025/0005972 A1     Jan. 2, 2025

(30) Foreign Application Priority Data

Jun. 29, 2023    (JP) ................................. 2023-106613

(51) Int. Cl.
*G07C 5/00*        (2006.01)
*G06F 21/62*       (2013.01)
(52) U.S. Cl.
CPC ......... *G07C 5/008* (2013.01); *G06F 21/6245* (2013.01)
(58) Field of Classification Search
CPC ... G07C 5/008; G06F 21/6245; G08G 1/0116; G08G 1/0129; G08G 1/0137

USPC ........................................................ 701/31.4
See application file for complete search history.

(56) References Cited

U.S. PATENT DOCUMENTS

| | | | |
|---|---|---|---|
| 9,541,419 B2 * | 1/2017 | Borghesani | ............ G07C 5/008 |
| 10,832,261 B1 * | 11/2020 | Chan | .................. G06Q 30/0255 |
| 2017/0265044 A1 * | 9/2017 | Lundsgaard | ............ H04W 4/48 |
| 2022/0050925 A1 * | 2/2022 | Gyllenram | ............ H04W 12/02 |
| 2023/0034498 A1 | 2/2023 | Kitani et al. | |

FOREIGN PATENT DOCUMENTS

| | | |
|---|---|---|
| JP | 2014-241098 A | 12/2014 |
| JP | 2023-019795 A | 2/2023 |
| WO | 2022/036167 A1 | 2/2022 |

OTHER PUBLICATIONS

English Abstract for JP 2023-019795A.

* cited by examiner

*Primary Examiner* — Tyler D Paige
(74) *Attorney, Agent, or Firm* — Oliff PLC

(57) ABSTRACT

The information processing device receives first data related to travel from the vehicle. The information processing device sends data user information related to a plurality of data users who wants to be provided with the first data to the user equipment of the vehicle user. The information processing device receives, from the user equipment, permission information indicating a data user permitted by the vehicle user to be provided with the first data. The information processing device sends the first data to the server of the data user permitted by the vehicle user to be provided with the first data.

4 Claims, 5 Drawing Sheets

DATA USER SERVER 200

DATA USER SERVER 200

DATA USER SERVER 200

MANAGEMENT SERVER 100

SEND TRAVEL DATA TO SERVER OF DATA USER PERMITTED TO BE PROVIDED WITH TRAVEL DATA

DATA USER INFORMATION

PERMISSION INFORMATION

TRAVEL DATA

USER EQUIPMENT 300

VEHICLE USER

VEHICLE 10

TRAVEL DATA

| VEHICLE ID | DATE AND TIME | POSITION | SPEED | ACCELERATION | ... |
|---|---|---|---|---|---|
| V001 | ... | ... | ... | ... | ... |

FIG. 4A

VEHICLE USER INFORMATION DATABASE

| VEHICLE USER ID | VEHICLE ID | PERSONAL INFORMATION |
|---|---|---|
| U001 | V001 | ... |
| U002 | V002 | ... |
| ... | ... | ... |

FIG. 4B

DATA USER INFORMATION DATABASE

| DATA USER ID | PURPOSE OF USE | DATA STORAGE PERIOD | ... |
|---|---|---|---|
| D001 | MARKETING | ... | ... |
| D002 | NONPROFIT STATISTICAL ANALYSIS | ... | ... |
| D003 | INVESTIGATION OF INCIDENTS AND ACCIDENTS | ... | ... |
| ... | ... | ... | ... |

INFORMATION PROCESSING DEVICE AND STORAGE MEDIUM

CROSS-REFERENCE TO RELATED APPLICATION

This application claims priority to Japanese Patent Application No. 2023-106613 filed on Jun. 29, 2023, incorporated herein by reference in its entirety.

BACKGROUND

1. Technical Field

The present disclosure relates to collection of data related to travel of a vehicle and provision of the data to a third party.

2. Description of Related Art

Japanese Unexamined Patent Application Publication No. 2014-241098 (JP 2014-241098 A) discloses a sensor data management system. In the sensor data management system disclosed in JP 2014-241098 A, a server that manages sensor data performs an anonymization process according to the definition of an anonymization policy settings file. In the anonymization process, the server individually anonymizes designated data items of the sensor data under designated conditions. A combination of desired data items of the sensor data including the anonymized sensor data generated by the anonymization process is sent to another server.

SUMMARY

It is an object of the present disclosure to allow a user associated with a vehicle to limit to whom to provide data related to travel of the vehicle.

An information processing device according to a first aspect of the present disclosure includes a control unit configured to receive first data related to travel from a vehicle, send data user information about a plurality of data users who wants to be provided with the first data to user equipment of a vehicle user associated with the vehicle, receive permission information from the user equipment, permission information indicating one or more data users selected from the data users by the vehicle user based on the data user information and permitted by the vehicle user to be provided with the first data, send the first data to a server of the one or more data users permitted by the vehicle user to be provided with the first data.

A storage medium according to a second aspect of the present disclosure stores a program that causes user equipment of a vehicle user associated with a vehicle to perform an information processing method.

The information processing method includes receiving, from a management server, data user information about a plurality of data users who wants to be provided with first data, receiving one or more data users selected from the data users by the vehicle user based on the data user information and permitted by the vehicle user to be provided with the first data, and sending permission information indicating the received one or more data users to the management server.

According to the present disclosure, it is possible for a user associated with a vehicle to limit to whom to provide data related to travel of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram illustrating an example of a table configuration of travel data sent from a vehicle to a management server;

FIG. 4A is a diagram illustrating an example of a table configuration of a vehicle-user-information database;

FIG. 4B is a diagram showing an exemplary table configuration of a data user information database.

DETAILED DESCRIPTION OF EMBODIMENTS

Figure 1:
FIG. 1 is a diagram illustrating a flow of data in a data providing system according to an embodiment.

In recent years, efforts have been made to collect travel data (hereinafter, sometimes referred to as "travel data") from many vehicles and utilize the collected travel data as big data. However, it is not always acceptable for a user (vehicle user) associated with the vehicle to provide travel data to all third parties who want to be provided with the travel data. That is, the vehicle user may not allow to provide the travel data to some of the third parties who want to be provided with the travel data. Here, the third party is a data user who utilizes the collected travel data as big data. Therefore, the present disclosure provides a technique that enables a vehicle user to restrict to whom to provide travel data of a vehicle.

An information processing device according to a first aspect of the present disclosure includes a control unit. The control unit receives the first data from the vehicle. The first data is travel data. The first data may be acquired while the vehicle is traveling by various sensors mounted on the vehicle. The control unit sends the data user information to the user equipment of the vehicle user associated with the vehicle. The data user information is information about a plurality of data users who want to be provided with the first data. The data user information may include, for example, information regarding the purpose of use of the provided first data in each data user. In addition, the data user information may include information regarding the storage period of the provided first data in each data user. Note that data user information regarding a plurality of data users may be registered in advance in the information processing device. The data user information may be included in the data provision request sent from the server of each data user.

When data user information regarding a plurality of data users is received by the user equipment, the vehicle user can select one or more data users permitted to be provided with the first data (hereinafter sometimes referred to as "permitted users") based on the data user information. Then, the user equipment can accept selection of one or more permitted users by the vehicle user. Further, the user equipment may send permission information indicating one or more permitted users selected by the vehicle user to the information processing device.

Therefore, the control unit receives the permission information sent from the user equipment. Then, the control unit identifies one or more permitted users based on the permission information, and sends the first data to the server of the one or more permitted users. Note that the control unit may send the first data received from the vehicle to the server of the permitted user in a state where some processing is performed instead of the state as it is.

According to the present disclosure, a vehicle user can select a data user to be provided with the first data of the vehicle. Therefore, it is possible for the user associated with the vehicle to limit to whom to provide data related to travel of the vehicle.

Hereinafter, an embodiment of the present disclosure will be described with reference to the drawings. The dimensions, materials, shapes, relative arrangements, and the like of the components described in the present embodiment do not limit the technical scope of the present disclosure, unless otherwise specified.

Embodiment

System Overview

FIG. 1 is a diagram illustrating a flow of data in a data providing system according to the present embodiment. The data providing system 1 is a system for collecting travel data from the vehicle 10 and providing the collected travel data to a data user who is a third party. The data providing system 1 includes a vehicle 10, user equipment 300, a management server 100, and a plurality of data user servers 200.

The user equipment 300 is a terminal operated by a vehicle user associated with the vehicle 10. The vehicle user is, for example, a driver of the vehicle 10 or an owner of the vehicle 10. The management server 100 is a server device that collects travel data from the vehicle 10. The data user server 200 is a server device related to a data user who want to use travel data of the vehicle 10 as big data. In the present embodiment, the management server 100 corresponds to an "information processing device" according to the present disclosure. Although only one vehicle 10 is illustrated in FIG. 1, the data providing system 1 includes a plurality of vehicles 10. The management server 100 collects travel data from each of the plurality of vehicles 10.

The vehicle 10, the user equipment 300, the management server 100, and the data user servers 200 are connected to each other via a network. Here, as the network, for example, a Wide Area Network (WAN) which is a public communication network such as the Internet or a telephone communication network such as a mobile telephone may be adopted. The network may also include telephone communication networks for cellular phones and the like, and wireless communication networks such as Wi-Fi (registered trademark).

The vehicle 10 includes various sensors for acquiring travel data. The vehicle 10 then sends the travel data acquired during the travel to the management server 100 at a predetermined timing. For example, the vehicle 10 may periodically send the travel data to the management server 100 at predetermined intervals during traveling.

FIG. 2 is a diagram illustrating an example of a table configuration of travel data sent from the vehicle 10 to the management server 100. As shown in FIG. 2, the travel data includes vehicle ID fields, datetime fields, position fields, velocity fields, and acceleration fields. In the vehicle ID field, a vehicle ID that is identification information for identifying the vehicle 10 that is the source of the travel data is inputted. In the date and time field, information about the date and time when the travel data is acquired in the vehicle 10 is input. The position information of the vehicle 10 is input to the position field. In the speed field, speed information of the vehicle 10 is input. The acceleration information of the vehicle 10 is input to the acceleration field. In addition, ON and OFF of the start button (or the ignition switch) of the vehicle 10 may be determined. Further, the travel data may include image information captured by a camera mounted on the vehicle 10. The travel data does not necessarily have to be data acquired by a sensor mounted on the vehicle 10. In the present embodiment, the travel data corresponds to "first data" according to the present disclosure.

Further, the management server 100 sends the travel data of the vehicle 10 to the data user server 200 in response to the provision request from the data user. As a result, the data user can receive the travel data to be used as the big data. However, the vehicle user may not be allowed to provide the travel data of the vehicle 10 sent to the management server 100 to all the data users.

Therefore, in the present embodiment, the data user information regarding each data user is sent to the user equipment 300 of the vehicle user. The user equipment 300 has a processor such as Central Processing Unit (CPU), a main storage device such as Random Access Memory (RAM), a secondary storage device such as Read Only Memory (ROM), and a communication interface for connecting the user equipment 300 to a network. Examples of the user equipment 300 include a smartphone, a tablet computer, a mobile computer, and a wearable computer. In addition, the in-vehicle terminal mounted on the vehicle 10 may function as the user equipment 300. Further, the data user information includes at least information regarding the purpose of use of the provided travel data and information regarding the storage period of the provided travel data in each data user.

In the user equipment 300, data user information regarding each data user received from the management server 100 is presented to the vehicle user. As a result, the vehicle user can select one or more data users permitted to be provided with travel data of the vehicle 10 (permitted users) based on the data user information. The user equipment 300 accepts selection of one or more permitted users by the vehicle user. Then, the user equipment 300 sends permission information indicating one or more permitted users selected by the vehicle user to the management server 100.

Upon receiving the permission information from the user equipment 300, the management server 100 identifies one or more permitted users based on the permission information. The one or more permitted users identified at this time are any of a plurality of data users who has requested provision of the travel data of the vehicle 10. Then, the management server 100 sends the travel data of the vehicle 10 to the data user servers 200 of one or more permitted users.

Configuring the Management Server

Figure 3:
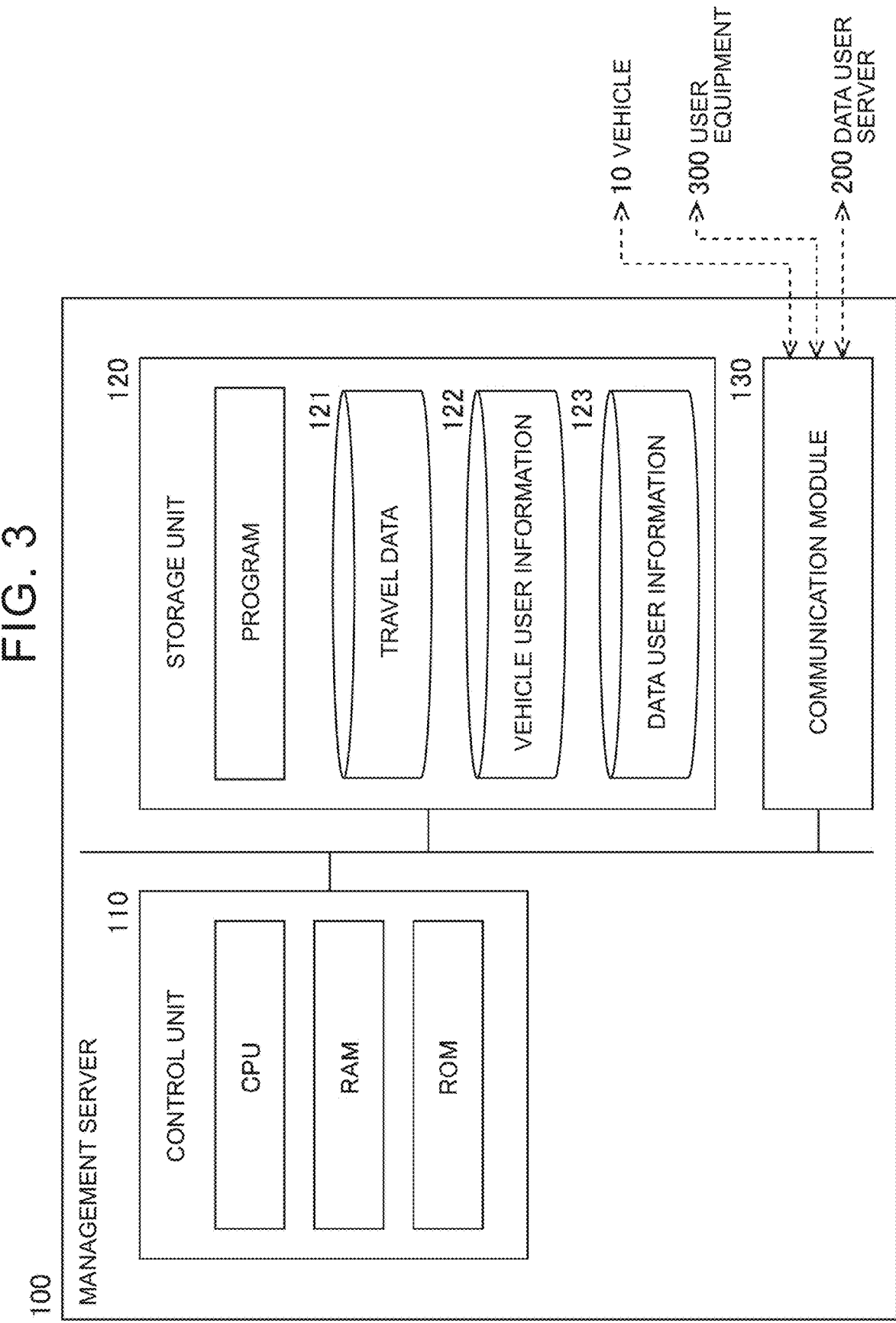
FIG. 3 is a block diagram schematically illustrating a configuration of a management server.

Next, the configuration of the management server 100 will be described. FIG. 3 is a block diagram schematically illustrating a configuration of the management server 100. The management server 100 includes a control unit 110, a storage unit 120, and a communication module 130. The control unit 110 has a function of performing arithmetic processing for controlling the management server 100. The control unit 110 includes a processor such as Central Processing Unit (CPU), a main storage device such as Random Access Memory (RAM), and a secondary storage device such as Read Only Memory (ROM). CPU is an exemplary processor resource. In addition, RAM and ROM are exemplary memory-resources. The control unit 110 can execute arbitrary information processing based on various programs and various data. However, some or all of the functions of the control unit 110 may be realized by a hardware-circuit such as an ASIC, FPGA.

The storage unit 120 is constituted by any storage device such as a RAM, ROM, a hard disk drive, or a flash memory. The storage unit 120 may include a removable medium (portable recording medium). Here, the removable medium is, for example, a USB memory, a SD card, or a disc recording medium such as a CD-ROM, DVD disc or a Blu-ray disc. The storage unit 120 stores programs to be executed by the control unit 110 and various types of data to be used for executing the programs.

In the storage unit 120, a database for storing travel data 121 received from each vehicle 10 is constructed. In this database, travel data 121 is stored for each vehicle 10. In addition, a database (vehicle user information database) for storing vehicle data user information 122 related to each vehicle user is constructed in the storage unit 120. A database (data user information database) for storing data user information 123 related to each data user is constructed in the storage unit 120.

FIG. 4A is a diagram illustrating an example of a table configuration of a vehicle-user-information database. As shown in FIG. 4A, the vehicle user information database includes a vehicle user ID field, a vehicle ID field, and a personal information field. In the vehicle user ID field, a data user ID that is an identification information for identifying the vehicle user is inputted. In the vehicle ID field, a vehicle ID that is identification information for identifying the vehicle 10 corresponding to the vehicle user is inputted. In the personal information field, personal information of the vehicle user is input. Here, the personal information of the vehicle user may include, for example, an address of the vehicle user, a contact address (a telephone number, an e-mail address, and the like), and the like. In the vehicle user information database, information registered in advance by each vehicle user is input.

FIG. 4B is a diagram illustrating an example of a table configuration of a data user information database. As shown in FIG. 4B, the data user information database includes at least a data user ID field, a usage purpose field, and a data storage period field. In the data user ID field, a data user ID that is an identification information for specifying a data user is inputted.

In the purpose-of-use field, information on the purpose of use of the travel data of each data user in the case where the travel data is provided from the management server 100 is input. Here, the purpose of use of the travel data of the data user may be exemplified by marketing, non-profit statistical analysis, and incident/accident investigation. More specifically, the marketing use of the travel data is, for example, a commercial area analysis of a vehicle user. Further, the non-profit statistical analysis is, for example, a traffic amount survey of each road or a congestion prediction of each road. In addition, the case/accident investigation is, for example, a search for a vehicle that has passed through the vicinity of a specific case/accident site.

In some data users, the travel data is used for data analysis according to the purpose of use, and then the travel data is immediately deleted from the data user server 200. In some cases, the travel data is stored in the data user server 200 for a relatively long period of time. In the data storage period field, information on the storage period of the travel data in each data user server 200 in the case where the travel data is provided from the management server 100 is input.

In the data user information database, information registered in advance by each data user is input. Data user information may be included in a data provision request sent from each data user server 200 to the management server 100.

The communication module 130 is a communication interface for connecting the management server 100 to a network. The communication module 130 is, for example, a Local Area Network (LAN) interface board or wireless communication circuitry for wireless communication. However, the management server 100 may not be necessarily realized by a single physical configuration, and may be configured by a plurality of computers that cooperates with each other.

Flow of Information Processing

Figure 5:
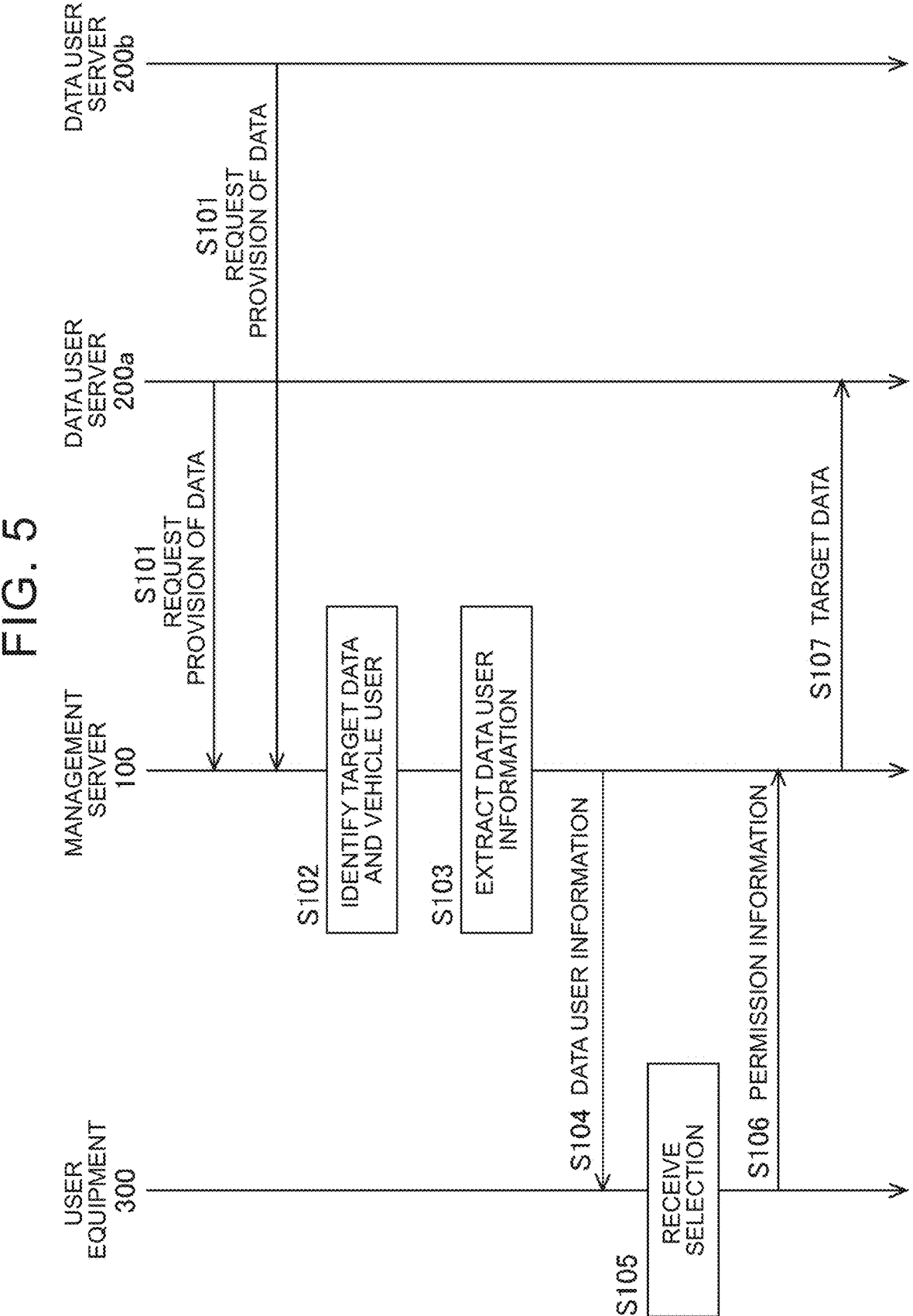
FIG. 5 is a sequence diagram illustrating a flow of information processing in the data providing system.

Hereinafter, a flow of information processing in the data providing system 1 according to the present embodiment will be described with reference to FIG. 5. FIG. 5 is a sequence diagram illustrating a flow of information processing in the data providing system 1. In FIG. 5, a reference number of one data user server among the plurality of data user servers 200 is taken as a 200a, and a reference number of another data user server among the plurality of data user servers 200 is taken as a 200b.

In the data providing system 1, the control unit 110 of the management server 100 receives a data providing request from a plurality of data user servers 200 (200a, 200b) (S101). Here, the data provision request includes a data user ID of the data user of the request source. In addition, the data provision request includes the condition of the travel data 121 that is the target of the provision request. The condition of the travel data 121 that is the target of the provision request may be defined by, for example, the acquisition time and the acquisition area of the travel data 121 in the vehicle 10. In addition, the vehicle 10 that has acquired the prime row data may be specified as the condition of the travel data 121 that is the target of the provision request.

Next, the control unit 110 of the management server 100 identifies the vehicle user of the vehicle 10 that has acquired the travel data 121 (hereinafter, sometimes referred to as "target data") and the target data to be provided to the data user (S102). Here, the control unit 110 refers to a database that stores the travel data 121 in the storage unit 120, and specifies the travel data 121 that satisfies the condition of the travel data 121 that is the target of the data provision request as the target data. Further, the control unit 110 identifies the vehicle user of the vehicle 10 that has acquired the target data by referring to the vehicle user information base in the storage unit 120. Here, the vehicle user corresponding to the vehicle ID of the vehicle 10 is identified.

Next, the control unit 110 of the management server 100 refers to the data user information database in the storage unit 120 to extract data user information related to a plurality of data users who has requested provision of data (S103). Here, data user information corresponding to the data user ID included in the data provision request received from the respective data user servers 200 (200a, 200b) is extracted. Next, the control unit 110 of the management server 100 sends the data user information regarding the plurality of data users extracted by S103 to the user equipment 300 of the vehicular user identified by S102 (S104).

The user equipment 300 outputs data user information related to a plurality of data users received from the management server 100. Accordingly, the vehicle user can select a permitted user based on the data user information of each data user. For example, the vehicle user may select a permitted user based on the purpose of use of the travel data of each data user. Specifically, the vehicle user may select a data user excluding a data user whose purpose of use of the travel data is marketing as a permitted user. In addition, the vehicle user may select the permitted user based on the storage period of the travel data of each data user. Specifically, the vehicle user may select a data user having a relatively short storage period of travel data as a permitted user.

Then, the user equipment 300 accepts selection of one or more permitted users by the vehicular user (S105). Further, the user equipment 300 sends permission information indicating one or more permitted users selected by the vehicular user to the management server 100 (S106). The permission information may include a data user ID of one or more permitted users.

Upon receiving the permission information from the user equipment 300, the control unit 110 of the management server 100 sends the target data specified by S102 to the data user server 200 of one or more permitted users indicated by the permission information (S107). In FIG. 5, the data user server 200*a* is a data user server of a permitted user. At this time, the control unit 110 may perform a processing process according to a request of a permitted user on the travel data 121 stored in the database of the storage unit 120, and then send the target data to the data user server 200*a*.

According to the flow as described above, the travel data of the vehicle 10 is sent to the data user server 200 of the permitted user selected by the vehicle user of the vehicle 10. In other words, the travel data of the vehicle 10 is not sent to the data user server 200 of the data user that the vehicle user of the vehicle 10 has not selected as the permitted user. Therefore, the vehicle user can limit to whom to provide travel data of the vehicle 10.

Modified Examples

A modified example of the present embodiment will be described hereinbelow. In the present modification, it is assumed that the data user uses not only the travel data of the vehicle 10 but also the personal information of the vehicle user as big data.

In the modification, when the control unit 110 of the management server 100 sends the data user information to the user equipment 300, the data user also sends information indicating that the data user also requests provision of predetermined personal information related to the vehicle user. Then, the control unit 110 receives the additional information together with the permission information from the user equipment 300 of the vehicle user. Here, the additional information is information indicating whether or not the vehicle user is permitted to provide predetermined personal information regarding the vehicle user to the permitted user.

Based on the additional information received from the user equipment 300, the control unit 110 of the management server 100 determines whether or not to provide predetermined personal information regarding the vehicle user to the permitted user. Specifically, in the additional information, if the vehicle user is permitted to provide predetermined personal information regarding the vehicle user to the permitted user, the control unit 110 refers to the vehicle user database in the storage unit 120 and extracts predetermined personal information regarding the target vehicle user. Then, the control unit 110 sends the extracted predetermined personal information regarding the vehicle user to the data user server 200 of the permitted user together with the travel data of the vehicle 10.

According to this modification, it is possible for the vehicle user to limit provision of the personal information related to the vehicle user to the data user in distinction from the provision of the travel data of the vehicle 10.

Other Embodiments

The above-described embodiments are merely examples, and the present disclosure may be appropriately modified and implemented without departing from the scope thereof. For example, the processes and means described in the present disclosure can be free combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc read-only memory (CD-ROM), digital versatile disc (DVD), Blu-ray disc, etc.), a read-only memory (ROM), a random access memory (RAM), an erasable programmable read-only memory (EPROM), an electrically erasable programmable read only memory (EEPROM), a magnetic card, a flash memory, or any type of medium suitable for storing electronic commands such as an optical card.

What is claimed is:

1. A system including an information processing device and a user terminal, wherein the information processing device comprises at least one memory storing a vehicle user information database and a data user information database, and a processor configured to:

receive travel data from sensors of vehicles;

receive data provision requests from a plurality of data users requesting provision of target data, each of the data provision requests including a condition;

identify the travel data fulfilling the condition as the target data;

identify a vehicle user associated with a target vehicle from the vehicles that acquired the target data by referring to the vehicle user information database;

extract data user information related to the data users who sent the data provision requests, the data user information including information about a storage period of the target data and information about a purpose of use of the target data when each of the data users is provided with the target data;

send the data user information that was extracted to the user terminal of the vehicle user associated with the target vehicle;

receive permission information from the user terminal, the permission information indicating one or more data users selected from the data users by the vehicle user based on the data user information and permitted by the vehicle user to be provided with the target data; and send the target data to a server of the one or more data users permitted by the vehicle user to be provided with the target data for traffic congestion analysis or accident investigation, wherein the user terminal of the vehicle user displays the data user information received from the information processing device, receives selection of the one or more data users permitted by the vehicle user to be provided with the target data, and sends the permission information to the information processing device.

2. The information processing device according to claim 1, wherein the processor is further configured to receive additional information together with the permission information from the user terminal, the additional information indicating whether the vehicle user has permitted to provide predetermined personal information about the vehicle user, together with the travel data, to the plurality of data users permitted by the vehicle user to be provided with the travel data.

3. The system according to claim 1, wherein the condition includes acquisition time and acquisition area of the travel data in a vehicle.

4. A non-transitory storage medium storing a program that causes an information processing device with at least one memory storing a vehicle information database and a data user information database to perform an information processing method, the information processing method comprising:

receiving, from a management server, travel data from sensors of vehicles;

receiving data provision requests from a plurality of data users requesting provision of target data, each of the data provision requests including a condition;

identifying the travel data fulfilling the condition as the target data;

identifying a vehicle user associated with a target vehicle from the vehicles that acquired the target data by referring to the vehicle user information database;

extracting data user information related to the data users who sent the data provision requests, the data user information including information about a storage period of the target data and information about a purpose of use of the target data when each of the data users is provided with the target data;

sending the data user information that was extracted to a user terminal of the vehicle user associated with the target vehicle;

receiving permission information from the user terminal, the permission information indicating one or more data users selected from the data users by the vehicle user based on the data user information and permitted by the vehicle user to be provided with the target data; and sending the target data to a server of the one or more data users permitted by the vehicle user to be provided with the target data for traffic congestion analysis or accident investigation, wherein the user terminal of the vehicle user displays the data user information received from the information processing device, receives selection of the one or more data users permitted by the vehicle user to be provided with the target data, and sends the permission information to the information processing device.

* * * * *